(No Model.) 2 Sheets—Sheet 1.
J. P. TIRRELL.
VALVE CONTROLLING CLUTCH.
No. 489,424. Patented Jan. 3, 1893.
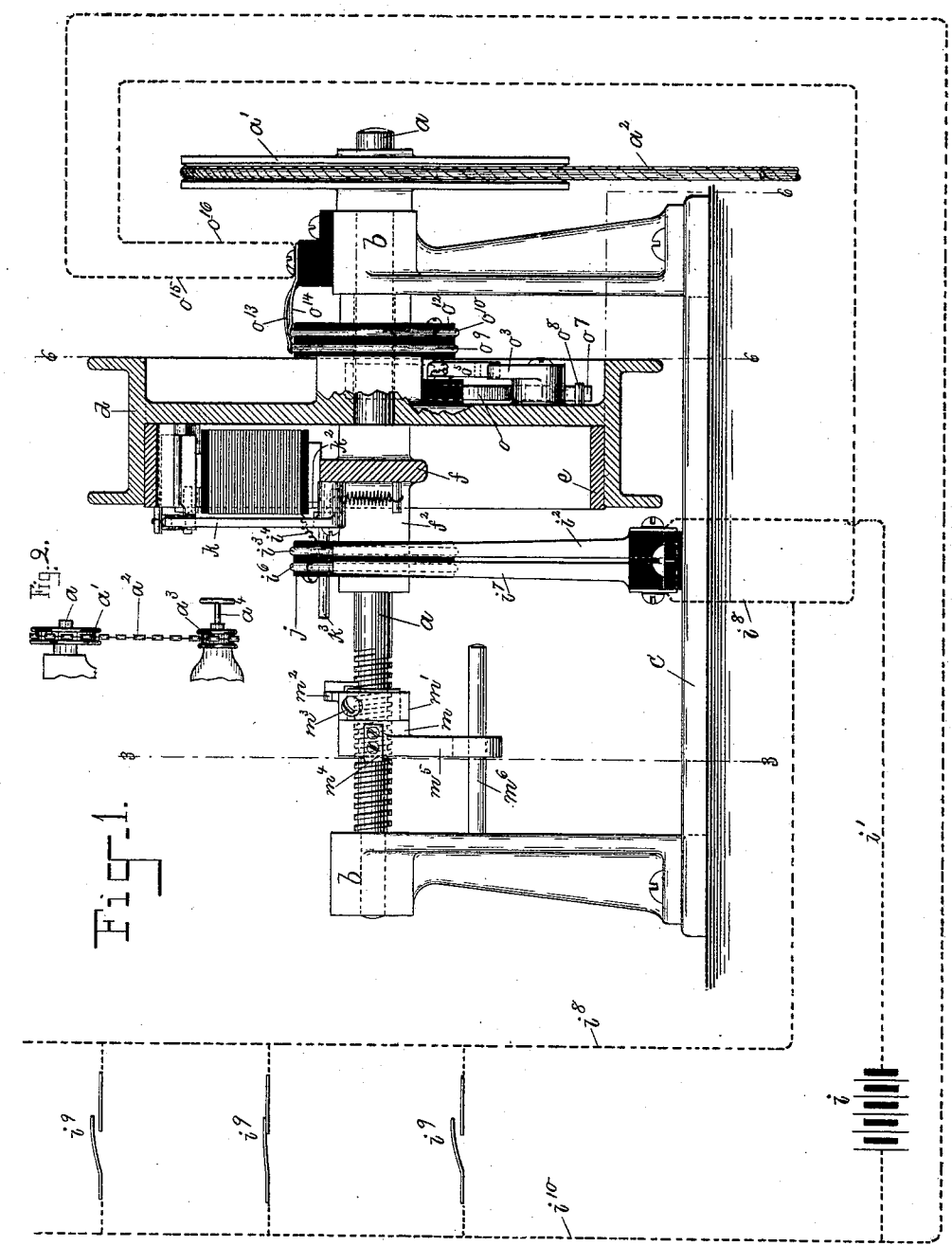
Witnesses.
John F. Nelson.
A. D. Harmon.
Inventor.
J. P. Tirrell (No Model.) 2 Sheets—Sheet 2.
J. P. TIRRELL.
VALVE CONTROLLING CLUTCH.
No. 489,424. Patented Jan. 3, 1893.
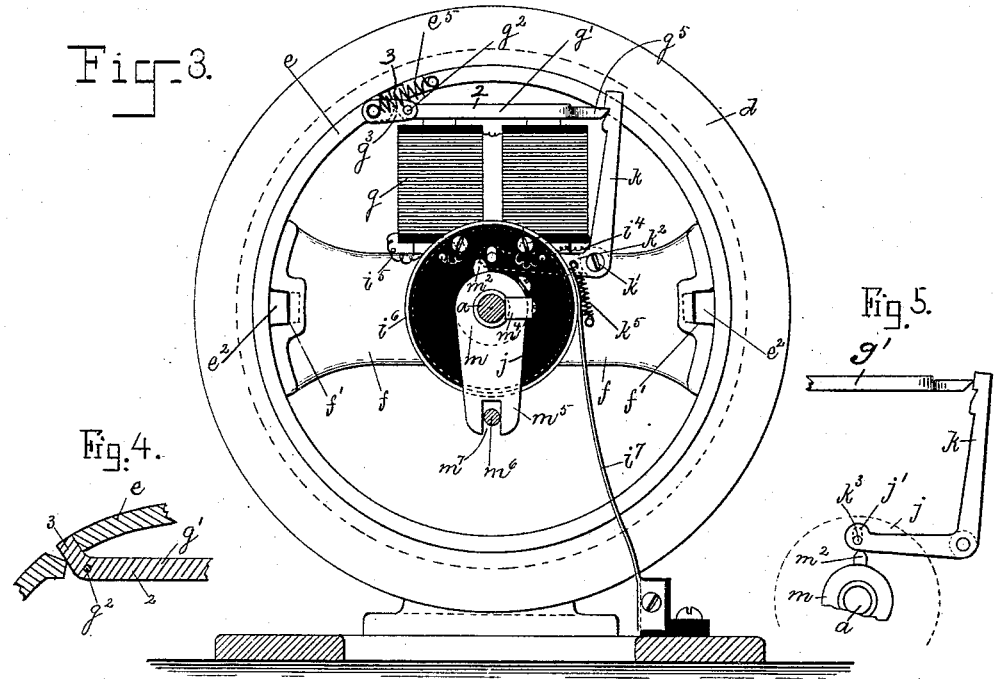
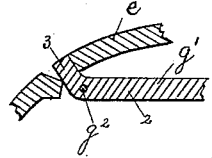
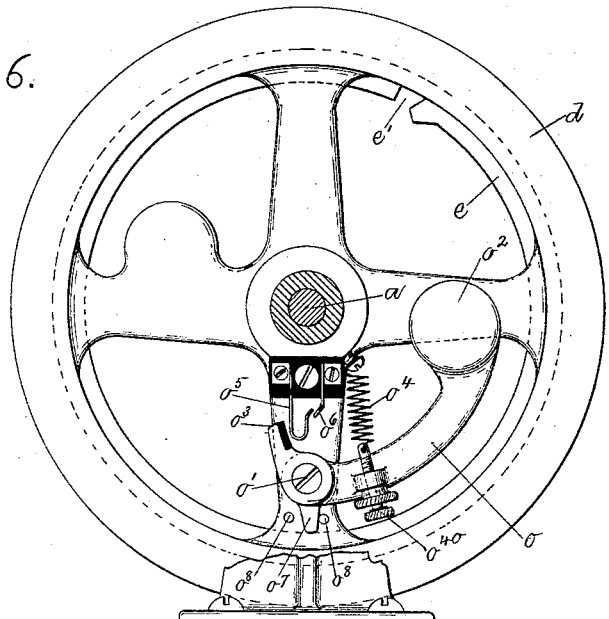
Witnesses.
John E. Nelson
A. D. Harrison
Inventor.
J. P. Tirrell
by Wright Brown Quimby
Attys.
THE NORRIS PETERS CO., PHOTO-LITHO., WASHINGTON, D. C.

UNITED STATES PATENT OFFICE.

JACOB P. TIRRELL, OF BOSTON, ASSIGNOR TO HERBERT O. EDGERTON, OF GREENFIELD, MASSACHUSETTS.

VALVE-CONTROLLING CLUTCH.

SPECIFICATION forming part of Letters Patent No. 489,424, dated January 3, 1893.

Application filed March 7, 1892. Serial No. 423,979. (No model.)

*To all whom it may concern:*

Be it known that I, JACOB P. TIRRELL, of Boston, in the county of Suffolk and State of Massachusetts, have invented certain new and useful Improvements in Apparatus for Transmitting Power, of which the following is a specification.

This invention relates generally to electrically-controlled apparatus for transmitting power from an engine or other source of power to any part or device to which it is desirable to impart motion, the apparatus being organized so that it is normally inoperative and is made operative by means of a make and break device in an electric circuit.

The invention relates particularly to apparatus for stopping an engine or other motor by its own power, applied through a connection between a moving part of the engine and a power-controlling device such as a throttle-valve, said connections being normally inoperative and made operative by an electrically-controlled coupling device whenever an electric circuit which controls said coupling device is closed.

The object of the invention is, first, to enable the armature of an electro-magnet to act as a coupling device to engage an elastic clutch with a pulley, and thus cause one of said parts to impart motion to the other.

The invention also has for its object to provide a simple and effective organized apparatus, including an elastic clutch and an armature lever for operating the same, adapted to transmit power for the purpose above indicated or for any other purpose to which it may be applied.

To these ends, the invention consists, first, in the combination of a pulley, a clutch ring arranged contiguous to the pulley and adapted to be moved into engagement therewith, one of said parts being adapted to be driven by power, a lever arranged to act as an armature and engaged with the clutch, and an electro-magnet arranged to attract said armature and thereby cause it to give the latter a clutch-operating movement, so that the power-driven part will impart motion to the other part.

The invention also consists in certain improvements in an organized apparatus, including the elements above mentioned, all of which I will now proceed to describe.

Of the accompanying drawings, forming part of this specification: Figure 1 represents a side elevation, partly in section, of an apparatus embodying my improvements, and a diagram of the electrical connections. Fig. 2 represents a view showing the connection between the apparatus and the throttle-valve of the engine. Fig. 3 represents a section on line 3—3, Fig. 1, looking toward the right. Fig. 4 represents a sectional view of a part of the construction shown in Fig. 3. Fig. 5 represents a side view of a part of the construction shown in Fig. 3. Fig. 6 represents a section on line 6—6, Fig. 1, looking toward the left.

The same letters and numerals of reference indicate the same parts in all the figures.

In the drawings: $a$ represents a shaft, journaled in bearings $b\ b$ on a supporting base or frame $c$. To said shaft is attached a wheel or pulley $a'$, which is connected by any suitable means, such as a belt $a^2$ or a sprocket-chain, with a suitable wheel $a^3$ (Fig. 2), affixed to the stem $a^4$ of a throttle-valve which controls the power of the engine.

$d$ represents a pulley, adapted to rotate loosely on the shaft $a$, said pulley being connected by a belt with a shaft driven by the power of the engine whose throttle-valve is controlled by the apparatus.

$e$ represents a clutch, which is a ring, cut at $e'$ (Fig. 5), and formed to bear, when sprung from its normal position, upon a surface on the pulley $d$, and thus establish a frictional connection between itself and said pulley, said ring being adapted to separate from the pulley when it assumes its normal position. The ring $e$ is suitably engaged with the shaft $a$, so as to rotate therewith, the engagement being preferably effected by inwardly-projecting lugs or tenons $e^2\ e^2$ on the inner periphery of the clutch, which enter slots or mortises $f'\ f'$ in arms $f\ f$ formed on a hub or collar $f^2$, which is rigidly attached to the shaft $a$. The tenons $e^2\ e^2$ are fitted loosely in the slots $f'\ f'$, so that the arms $f\ f$, which move with the shaft $a$, support and rotate the clutch ring $e$ without interfering with its expansion and contraction.

$g$ represents an electro-magnet, which is affixed to the arms $f f$, and therefore revolves with said arms. The armature $g'$ of said electro-magnet is formed as a two-armed lever, pivoted at $g^2$ to an ear $g^3$ affixed to one end of the clutch ring $e$. Said lever is composed of a longer arm 2 which is the armature proper, and a shorter arm 3 preferably arranged at an angle to the arm 2. The shorter arm 3 projects into the opening $e'$ in the clutch ring and is in contact with the ends of said ring, the arrangement being such that, when the armature is attracted to the poles of the electro-magnet, the shorter arm 3 will pry apart the ends of the clutch ring and thus expand the latter and cause it to engage the pulley $d$. The pulley is thus caused to rotate the shaft $a$, so that power is transmitted from the pulley through the clutch ring, arms $f f$, shaft $a$ and the described connections between said shaft and the valve-stem, to the throttle-valve, which is thus closed. The electro-magnet is included in an electric circuit, which includes a battery $i$ or other source of electricity, a wire $i'$ from one pole of the battery to a contact spring $i^2$, a conducting ring $i^3$ on which said spring bears, said ring being attached to a disk $j$ of insulating material attached to the shaft $a$ or hub $f^2$, a wire $i^4$ connected with said ring and with one pole of the electro-magnet, a wire $i^5$ connected with the other pole of said magnet, a conducting ring $i^6$ on the disk $j$ connected with wire $i^5$, a spring $i^7$ bearing on the ring $i^6$, a wire $i^8$ connected with spring $i^7$, one or more circuit closers $i^9$, which may be ordinary push buttons, and a wire $i^{10}$ connected with the opposite pole of the battery. Whenever the circuit is closed by one of the push buttons, the magnet is energized, with the result above described, the rings $i^3$ $i^6$ and springs $i^2$ $i^7$ keeping the circuit operative notwithstanding the revolving movement of the electro-magnet. The armature $g'$ is locked as soon as it assumes its clutch-operating position, by means of a detent lever $k$, which is pivoted at $k'$ to one of the arms $f$, and is provided with a notch, adapted to engage a tooth $g^5$ on the outer end of the armature. Hence the clutch is held in its operative or expanded position without regard to the condition of the circuit, so that the breaking of the circuit will not make the clutch inoperative. The detent lever $k$ is provided with an arm $k^2$ (Figs. 1 3 and 5), projecting inwardly over the shaft $a$, the lever $k$ and arm $k^2$ constituting a bell-crank lever. The end of the arm $k^2$ over the shaft is provided with a stud or pin $k^3$, which projects through a slot $j'$ in the disk $j$, and is substantially parallel with the shaft $a$. The slot $j'$, is shown in dotted lines in Fig. 5.

$k^5$ represents a spring, which holds lever $k$ in position to engage the armature.

$m$ represents a nut or collar, which is engaged with a screw-threaded portion of the shaft $a$, and is provided with an arm $m^5$, having a slot $m^7$, which embraces a guide-rod $m^6$, affixed to a fixed support such as one of the bearings $b$. When the shaft $a$ is rotated by the pulley $d$, as above described, the nut $m$ is prevented from rotating with the shaft by the arm $m^5$ and rod $m^6$, hence said nut is caused to move along the shaft toward the pulley until a tooth $m^2$, which projects from the nut, enters the path in which the stud $k^3$ is caused to revolve by the rotation of the shaft. Said tooth is arranged to strike the stud $k^3$, and force the same outwardly, thus moving the lever and releasing the armature $g'$, as shown in Fig. 5. The release of the armature releases the clutch ring, which thereupon is disengaged from the pulley $d$, the result being the stoppage of the rotation of the shaft, this result occurring when the throttle-valve has been closed. The engine now remains at rest until the throttle-valve is opened by the backward rotation of its stem $a^4$, this rotation being imparted to the shaft $a$ through the described connections, and causing the nut $m$ to recede from the path of the stud $k^3$, so that the apparatus is ready for the next operation.

The nut $m$ is preferably formed as a collar, having no internal screw-thread, and engaged with the thread on the shaft by means of an ear or lug $m^4$, detachably secured to the collar by screws or otherwise. This construction enables the nut to be quickly adjusted on the shaft by releasing the lug $m^4$, moving the nut or collar to the desired position, and then securing the lug. The tooth $m^2$ is preferably formed on a collar $m'$, which is adapted to be turned on the nut or collar $m$, to give the tooth any desired adjustment, and is secured by a set-screw $m^3$.

I have provided improved governor devices for operating the clutch by an increase in the speed of the engine above the normal rate, said devices being as follows: $o$ represents an arm, pivoted at $o'$ to the pulley $d$, and provided with a weight or enlargement $o^2$ at its swinging end, and with a short arm or lug $o^3$, arranged to move a circuit-closing spring or terminal $o^5$ into contact with another spring or terminal $o^6$ whenever the weighted end of lever $o$ is thrown outwardly by centrifugal force. A spring $o^4$ holds the lever $o$ in the position shown in Fig. 6, when the speed does not exceed the normal rate, so that the arm $o^3$ does not act on the terminal $o^5$ until the speed increases to such an extent as to force the arm $o$ outwardly against the resistance of the spring $o^4$. The terminals $o^5$ $o^6$ are included in a branch of the electric circuit above described, said branch comprising conducting rings $o^9$ $o^{10}$, mounted on the periphery of an insulating disk $o^{12}$, attached to the shaft $a$, and connected by wires with the said terminals, springs $o^{13}$ $o^{14}$ bearing on said rings, and wires $o^{15}$ $o^{16}$ connected as shown in Fig. 1 with the wires of the main circuit, the arrangement being such that, when the terminal $o^5$ is moved by the lever $o$ into contact with the terminal $o^6$, the circuit is closed, with the same result as that produced by the operation of one of the circuit closers $i^9$. The spring $o^4$ is preferably made adjustable by means of a screw $o^{40}$, and the play of the lever $o$ is preferably limited by means of stop pins $o^8$ $o^8$ affixed to the pulley, and an ear $o^7$ affixed to the lever between said stop pins.

I do not limit myself to the described relative arrangement of the clutch ring and the surface on the pulley with which said ring co-operates, and may make the said clutch ring and surface of any desired form, and give them any desired relative arrangement which will enable them to co-operate when the ring is moved by the armature, and to separate when the ring is released by the armature. In Fig. 3, I show a spring $e^5$, connected with the ends of the clutch and adapted to aid the clutch in its contractile movement.

The pulley $d$, instead of being driven continuously by the power of the engine when the latter is in operation, may be arranged to be rotated only when the circuit is closed to operate the clutch.

An important part of my invention is the combination of a movable clutch, a pulley from which said clutch is normally disengaged and with which it is adapted to be engaged by a movement from its normal position, a lever engaged with said clutch and adapted to move the latter into engagement with the pulley, and an electric circuit including an electro-magnet arranged to attract said lever as an armature, and thus give the lever its clutch-operating movement. Believing this combination to be new, I do not limit myself to its employment in an apparatus organized to stop engines, but may use it for any other purpose to which it is capable of being applied. For example, the power transmitted by the shaft, when the clutch is engaged with the loose pulley, may be used to open a valve, for the purpose of admitting water to the pipes of a fire extinguishing system. The shaft may be continuously driven instead of the pulley, and in such case the pulley will be rotated only when the clutch is engaged with it, so that the clutch and its electrically-controlled operating means may be used as a substitute for the mechanical clutch devices commonly used to connect a loose pulley with the shaft which gives it motion.

I claim:

1. The combination with a shaft and a loose pulley thereon, of a clutch rotatively engaged with the shaft and normally disengaged from the pulley, a lever engaged with the clutch and adapted to move it into engagement with the pulley, an electro-magnet arranged to attract said lever as an armature and thereby give the lever its clutch-operating movement, and a support common to said clutch, lever and electro-magnet, attached to the shaft.

2. The combination of a shaft, a loose pulley thereon adapted to be rotated by power, a clutch engaged with the shaft so as to rotate therewith, said clutch being adapted to be moved or displaced into contact with the pulley and thereby couple or connect the pulley with the shaft, an electro-magnet mounted on a support affixed to said shaft, a lever adapted to be attracted as an armature by said magnet, said lever being arranged to displace the clutch when the armature is attracted, and means for energizing said magnet, as set forth.

3. The combination of a shaft, a loose pulley thereon, a movable clutch arranged to co-operate with said pulley, an electro-magnet supported by the shaft, a pivoted armature arranged to move or displace said clutch when the armature is attracted by the magnet, a detent adapted to automatically engage said armature and hold it in its clutch-displacing position, and a device moved by the rotation of the shaft into position to displace said detent and release the armature, as set forth.

4. The combination of a shaft, a loose pulley thereon, a movable clutch engaged with the shaft, an electro-magnet and an armature therefor adapted to co-operate in engaging the clutch with the pulley, a detent lever adapted to retain said armature in its clutch-operating position, said lever having a stud or projection and a nut engaged with a threaded portion of the shaft and arranged to be moved by the rotation of the shaft into engagement with said stud and thereby displace the detent lever and release the armature, as set forth.

5. The combination of a shaft, a loose pulley thereon, a movable clutch engaged with the shaft, an electro-magnet and an armature therefor adapted to co-operate in engaging the clutch, a disk of insulating material affixed to said shaft, and an electric circuit including said magnet, conducting rings on said disk, a source of electricity, one or more circuit-closing devices and suitable electrical connections, said circuit being adapted to be closed to energize said magnet and thus cause the operation of the clutch, as set forth.

6. The improved power-transmitting apparatus, comprising a shaft, a loose pulley thereon, a movable clutch engaged with the shaft, an electro-magnet and an armature therefor adapted to operate said clutch and to revolve with the clutch and shaft, a weighted governor arm connected with the pulley, circuit-closing springs or terminals mounted on the pulley and adapted to be connected by the centrifugal action of said arm, and an electric circuit including a source of electricity, the magnet, the terminals and suitable connections, said circuit being adapted to be closed by the action of the governor arm when the speed of the pulley exceeds a normal rate, as set forth.

7. In an apparatus for stopping engines, the combination of a shaft, a loose pulley thereon, a governor movably connected to the pulley and adapted to be thrown outwardly by centrifugal force, an electric circuit including circuit-closing devices or electrodes mounted on the pulley and adapted to be operated by the governor to close the circuit when the governor is thrown outwardly, and an electrically-controlled clutch engaged with the shaft and adapted to connect the pulley with the shaft when said circuit is closed, as set forth.

8. In an apparatus for stopping engines, the combination of a shaft, a loose pulley thereon, a governor movably connected to the pulley and adapted to be thrown outwardly by centrifugal force, an electric circuit including circuit-closing devices or electrodes mounted on the pulley and adapted to be operated by the governor to close the circuit when the governor is thrown outwardly, an insulating disk affixed to the pulley, conducting rings on the periphery of said disk connected with said electrodes, springs bearing on the said rings and connected with the fixed conducting wires of the circuit, and an electrically-controlled clutch engaged with the shaft and adapted to connect the pulley with the shaft when said circuit is closed, as set forth.

In testimony whereof I have signed my name to this specification, in the presence of two subscribing witnesses, this 19th day of February, A. D. 1892.

JACOB P. TIRRELL.

Witnesses:
C. F. BROWN,
A. D. HARRISON.